United States Patent
Lo et al.

(10) Patent No.: US 9,430,434 B2
(45) Date of Patent: Aug. 30, 2016

(54) SYSTEM AND METHOD FOR CONSERVING MEMORY POWER USING DYNAMIC MEMORY I/O RESIZING

(71) Applicant: Qualcomm Incorporated, San Diego, CA (US)

(72) Inventors: Haw-Jing Lo, San Diego, CA (US); Dexter Chun, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 476 days.

(21) Appl. No.: 14/033,233

(22) Filed: Sep. 20, 2013

(65) Prior Publication Data

US 2015/0089112 A1    Mar. 26, 2015

(51) Int. Cl.
| G06F 13/16 | (2006.01) |
| G06F 13/40 | (2006.01) |
| G06F 1/32  | (2006.01) |

(52) U.S. Cl.
CPC ......... *G06F 13/4018* (2013.01); *G06F 1/3253* (2013.01); *G06F 1/3275* (2013.01); *G06F 13/1678* (2013.01); *Y02B 60/1225* (2013.01); *Y02B 60/1228* (2013.01); *Y02B 60/1235* (2013.01)

(58) Field of Classification Search
CPC .......... G06F 13/4018; G06F 13/1678; G06F 1/3275; G06F 1/3253; Y02B 60/1225; Y02B 60/1228; Y02B 1/1235
See application file for complete search history.

(56) References Cited

U.S. PATENT DOCUMENTS

| | | | |
|---|---|---|---|
| 5,953,746 A | 9/1999 | Crocker et al. | |
| 6,330,639 B1 | 12/2001 | Fanning et al. | |
| 7,188,198 B2 | 3/2007 | Beukema et al. | |
| 7,469,311 B1 * | 12/2008 | Tsu | G06F 13/4018 710/29 |
| 7,539,809 B2 * | 5/2009 | Juenger | G06F 13/40 370/465 |
| 7,949,817 B1 | 5/2011 | Sakarda | |
| 8,412,971 B2 | 4/2013 | Branover et al. | |
| 8,762,760 B2 * | 6/2014 | Shafai | H04W 52/0206 710/57 |
| 2006/0285847 A1 | 12/2006 | McCall et al. | |
| 2007/0067548 A1 * | 3/2007 | Juenger | G06F 13/40 710/315 |
| 2007/0101168 A1 | 5/2007 | Atkinson | |
| 2008/0142847 A1 * | 6/2008 | Matsuzaki | G11C 5/00 257/209 |
| 2013/0138815 A1 | 5/2013 | Gandhi et al. | |
| 2014/0149775 A1 * | 5/2014 | Ware | G06F 1/3293 713/323 |

FOREIGN PATENT DOCUMENTS

WO    2013009442 A2    1/2013

OTHER PUBLICATIONS

International Search Report and Written Opinion—PCT/US2014/056659—ISA/EPO—Jan. 8, 2015.

* cited by examiner

*Primary Examiner* — M Elamin
(74) *Attorney, Agent, or Firm* — Smith Tempel (57) ABSTRACT

Systems and methods are disclosed for conserving power consumption in a memory system. One such system comprises a DRAM memory system and a system on chip (SoC). The SoC is coupled to the DRAM memory system via a memory bus. The SoC comprises one or more memory controllers for processing memory requests from one or more memory clients for accessing the DRAM memory system. The one or more memory controllers are configured to selectively conserve memory power consumption by dynamically resizing a bus width of the memory bus.

32 Claims, 11 Drawing Sheets

SYSTEM AND METHOD FOR CONSERVING MEMORY POWER USING DYNAMIC MEMORY I/O RESIZING

DESCRIPTION OF THE RELATED ART

Computing devices (e.g., portable computing devices, tablet computers, mobile phones, etc.) continue to demand increased memory input/output (I/O) speeds to accommodate higher peak performance requirements. To address peak performance requirements, it is common to design computing devices with faster I/O speeds and wider memory buses. Computing devices with increased memory speeds, however, require increased power consumption. While increased power consumption may be an acceptable tradeoff for high performance I/O use cases, the majority of use cases for many computing devices do not require high performance I/O. For example, high performance I/O may be detrimental to low-to-medium performance use cases, such as, audio playback, voice calls, video playback, etc.

There are existing solutions for reducing the power consumption of relatively lower performance I/O uses by reconfiguring memory I/O operations to a "low power" mode. Typically, this means that the memory I/O is run at lower frequencies. Termination resistors, which are used for the signal integrity at higher frequencies, may be disabled during the "low power" mode. Furthermore, modification of signal swing may also be necessary. While this may help reduce power consumption during applicable use cases, frequency switching introduces an undesirable latency, typically 2 μs to 50 μs depending on the implementation.

SUMMARY OF THE DISCLOSURE

Systems and methods are disclosed for conserving power consumption in a memory system. One embodiment is a method for conserving power consumption in a memory system. One such method comprises: receiving a memory request from a memory client residing on a system on chip (SoC) for accessing a dynamic random access memory (DRAM) memory system coupled to the SoC via a memory bus; determining that the memory request from the memory client corresponds to a performance use case for using less than a full width of the memory bus; and conserving memory power consumption for the memory request corresponding to the performance use case by dynamically resizing the memory bus to less than the full width.

Another embodiment is a system for conserving power consumption in a memory system. One such system comprises a DRAM memory system and a system on chip (SoC). The SoC is coupled to the DRAM memory system via a memory bus. The SoC comprises one or more memory controllers for processing memory requests from one or more memory clients for accessing the DRAM memory system. The memory controllers are configured to selectively conserve memory power consumption by dynamically resizing a bus width of the memory bus.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "communication device," "wireless device," "wireless telephone", "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device may include a cellular telephone, a pager, a PDA, a smartphone, a navigation device, or a hand-held computer with a wireless connection or link.

Figure 1:
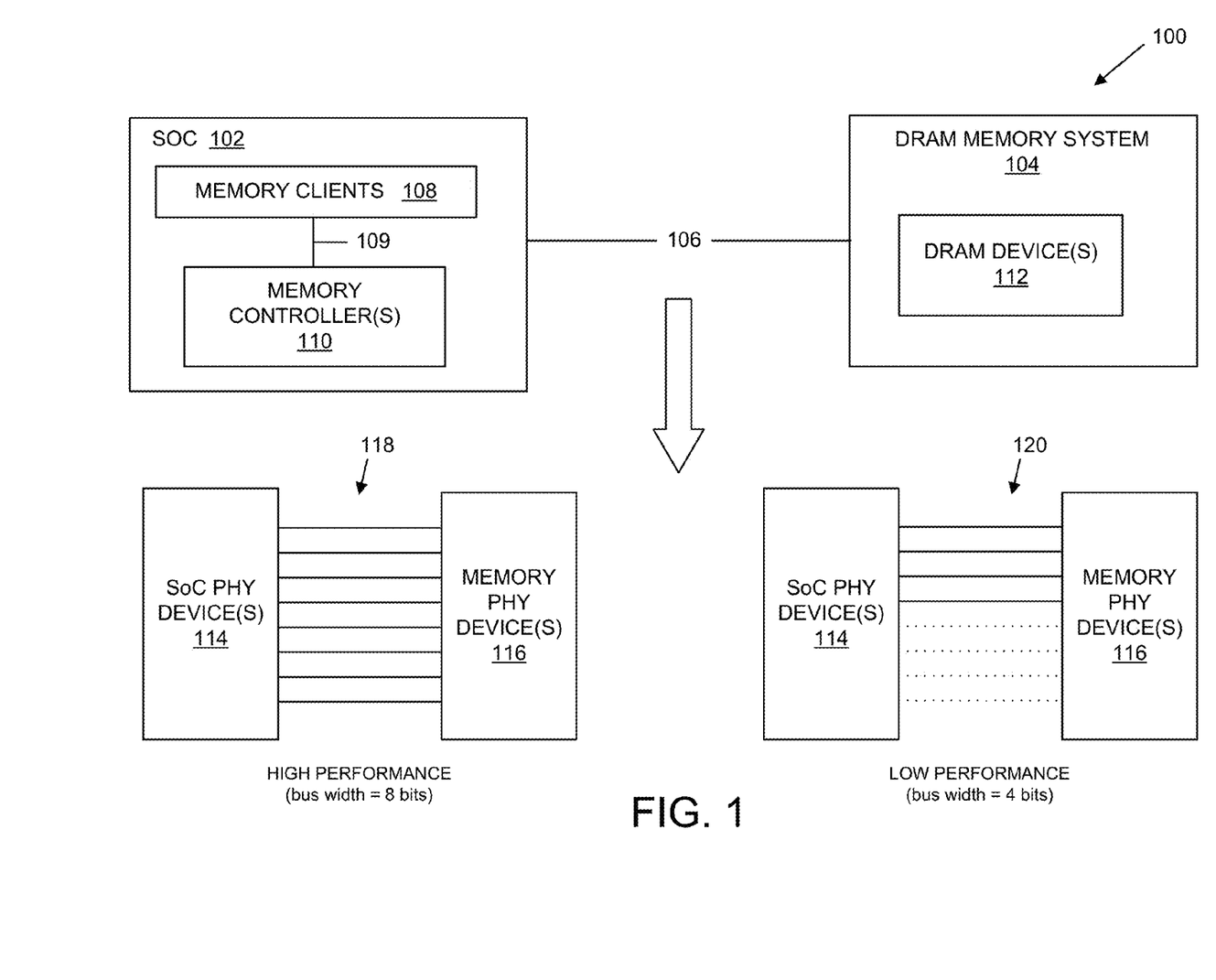
FIG. 1 is a block diagram of an embodiment of system for conserving DRAM memory power consumption using dynamic memory I/O resizing.

FIG. 1 illustrates a system 100 for conserving memory power consumption using dynamic memory input/out (I/O) resizing. The system 100 may be implemented in any computing device, including a personal computer, a workstation, a server, a portable computing device (PCD), such as a cellular telephone, a portable digital assistant (PDA), a portable game console, a palmtop computer, or a tablet computer. As illustrated in the embodiment of FIG. 1, the system 100 comprises a system on chip (SoC) 102 coupled to a DRAM memory system 104 via a memory bus 106. The SoC 102 comprises various on-chip components, including one or more memory clients 108 that request memory resources from DRAM memory system 104. The memory clients 108 may comprise one or more processing units (e.g., central processing unit (CPU), graphics processing unit (GPU), digital signal processor (DSP), display processor, etc.), a video encoder, or other clients requesting read/write access to DRAM memory system 104. The memory clients 108 are connected to one or more memory controllers 110 via a SoC bus 109.

The memory controller(s) 110 are configured to receive and process read/write memory requests to DRAM memory system 104. Memory data may be distributed between one or more memory controller(s) 110, which are connected to respective DRAM device(s) 112 via a dedicated memory channel. It should be appreciated that any number of DRAM devices 112, memory controllers 110, and memory channels may be used in the system 100 with any desirable types, sizes, and configurations of memory (e.g., double data rate (DDR) memory).

As illustrated in FIG. 1, the system 100 is configured to selectively provide two different channel modes for appropriate use cases: (1) a high performance channel mode 118; and (2) a low performance channel mode 120. High performance use cases may be processed in the high performance channel mode using the full width of the memory bus 106. In the example of FIG. 1, the full width of the memory bus 106 may comprise 8 bits. Each bit may comprise a separate pin, connection, or other physical layer components. It should be appreciated that there may be various use cases in which high performance is not needed (e.g., audio playback, voice calls on a mobile telephone, video playback, etc.) and suitable performance may be provided via less than the full width of the memory bus 106. For relatively lower performance use cases (or other situations in which power conservation is preferred over performance), memory power may be conserved by dynamically resizing the width of the memory bus 106. In this regard, it should be appreciated that the low performance use cases may comprise any situation in which a suitable performance may be provided with less than the full width of the memory bus 106 while yielding a reduction in memory power. For example, the 8-bit memory bus 106 may be resized to a 4-bit memory bus 106 during the low performance channel mode 120. As illustrated in the embodiment of FIG. 1, the channel width may be reduced by a factor of two by disabling four of the eight pins, connections, or other physical layer components (illustrated as dashed lines) comprising the memory bus 106.

Figure 2:
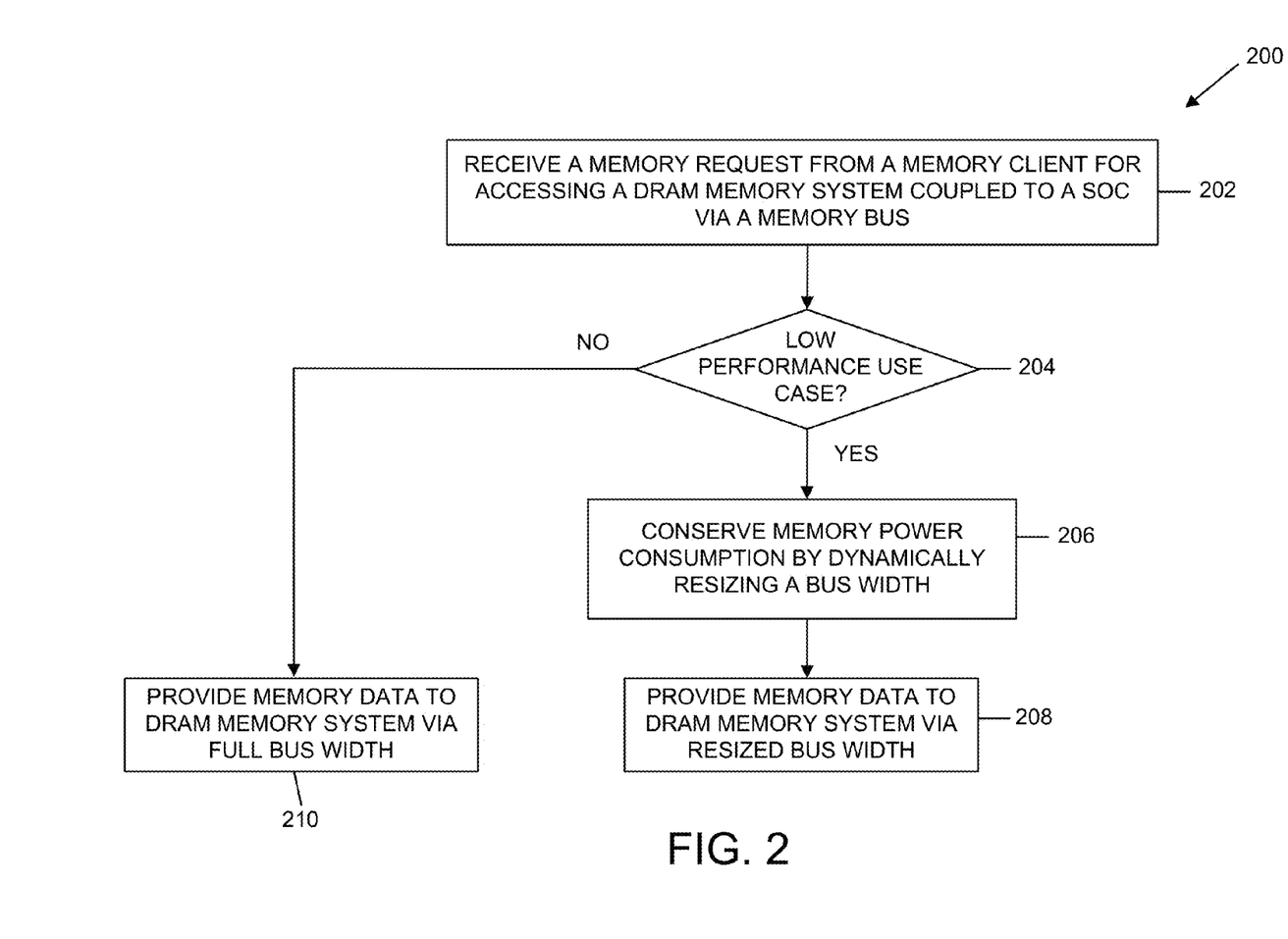
FIG. 2 is a flow chart illustrating an embodiment of a method implemented in the system of FIG. 1 for conserving DRAM memory power consumption.

FIG. 2 illustrates an embodiment of a method 200 implemented by the system 100 for conserving memory power using dynamic memory I/O resizing. At block 202, memory requests are received from the memory clients 108 for accessing the DRAM memory system 104. At decision block 204, the system 100 determines whether the memory request should be processed in the high performance channel mode 118 with using the full width of the memory bus 106 or the low performance channel mode 120 using less than the full width of the memory bus. It should be appreciated that the memory clients 108 may request a power or performance preference. For example, in an embodiment, channel width resizing bit(s) may be included in the read/write command to eliminate, which may eliminate the need for additional signal pins. The power or performance preference may be validated by the system 100. In other embodiments, memory clients 108 may be assigned to either the high performance channel mode 118 or the low performance channel mode 120 based on anticipated or calculated performance requirements. If the system 100 determines a high performance use case, at block 210, the memory data may be provided to the DRAM memory system 104 using the full bus width. If the system 100 determines that high performance is not needed or power conservation is preferred over performance, at block 206, memory power may be conserved by dynamically resizing the memory bus 106. At block 208, the memory data may be provided to the DRAM memory system 104 via the resized bus width.

It should be appreciated that the dynamic memory I/O resizing may be implemented in a single channel memory system or a multi-channel memory system. FIGS. 3-6 illustrate various embodiments of a single channel implementation of the dynamic memory I/O resizing.

Figure 3:
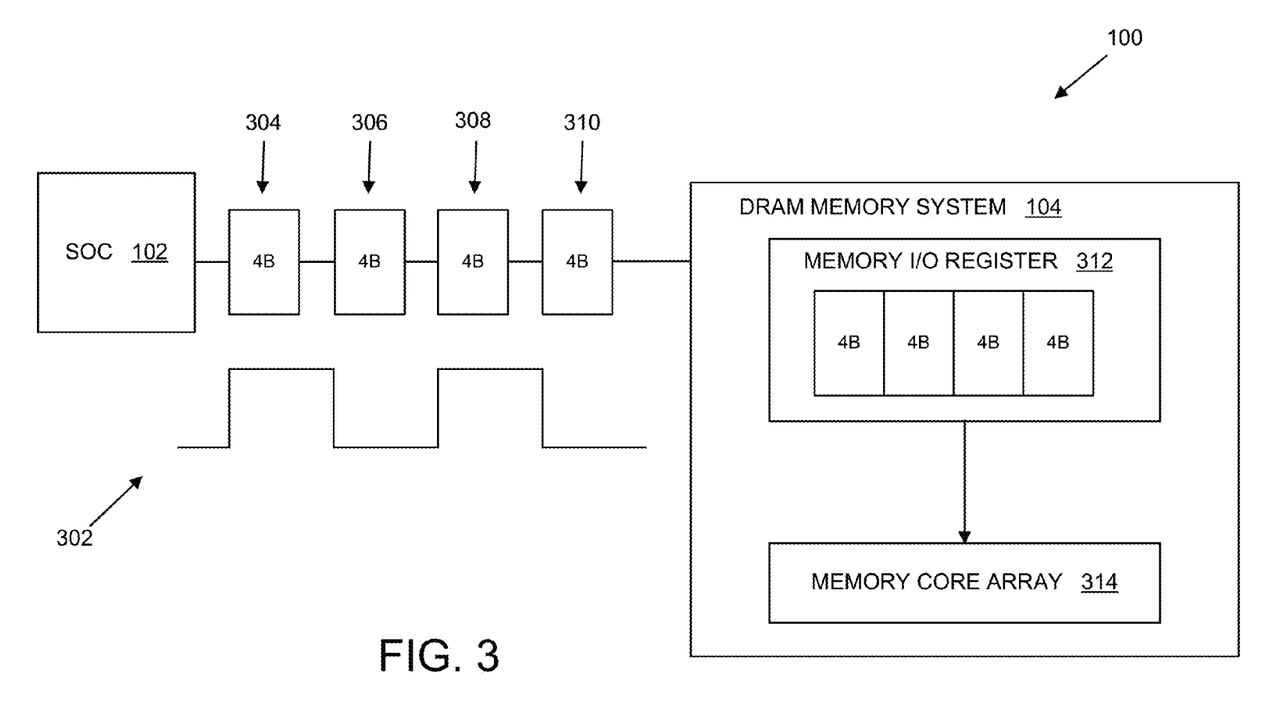
FIG. 3 is a block diagram illustrating a single channel embodiment of the system of FIG. 1 during a high performance mode.
Figure 4:
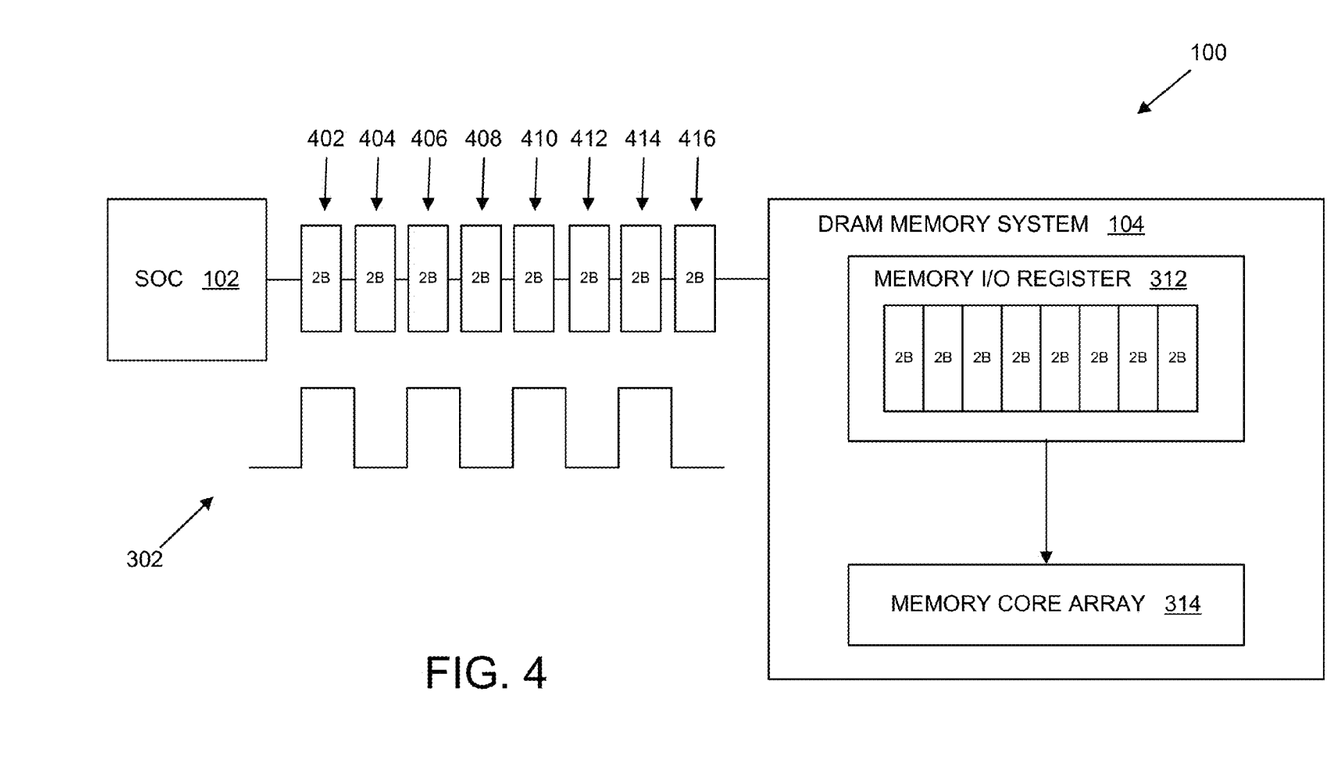
FIG. 4 is a block diagram illustrating the system of FIG. 3 during a low performance mode in which the bus width is dynamically resized to conserve memory power consumption.

FIGS. 3 & 4 illustrate an example in which the DRAM memory system 104 comprises a LPDDR2 memory device and the memory bus 106 comprises a 32-bit bus. As known in the art, a DRAM memory transaction is composed of multiple beats across the memory bus 106 based on a clock 302. The number of beats ("burst length") may be fixed and dependent on the type of DRAM device. For example, DDR type devices have a burst length of 2, DDR2 type devices have a burst length of 4, DDR3 type devices have a burst length of 8, etc. The combination of the number of beats with the bus width is defined as the minimum access length (MAL). The 32-bit wide LPDDR2 in the example of FIGS. 3 & 4 has a MAL size of 16 bytes (4 beats×32 bits=128 bits=16 bytes) with each beat 304, 306, 308 and 310 comprising 4 bytes. The DRAM memory system 104 comprises internal logic structures that receive the incoming stream of beats, via the memory bus 106, and places it in a MAL-sized register (e.g., memory I/O register 312), which is then loaded into the DRAM memory core array 314.

FIG. 3 illustrates operation of the exemplary system 100 in the high performance channel mode in which the full 32-bit bus width is used. FIG. 4 illustrates operation of the low performance channel mode in which the 32-bit channel width is dynamically resized, by a factor of two, to a 16-bit channel width. To maintain the predefined MAL size of 16 bytes with half the bus width, the SoC 102 is configured to double the number of beats. As illustrated in FIG. 4, each beat 402, 404, 406, 408, 410, 412, 414, and 416 is configured with 2 bytes instead of 4 bytes as used in the high performance channel mode. The DRAM memory system 104 receives the incoming stream of eight 2-byte beats and places it in the same 16-byte, MAL-sized memory I/O register 312. The memory I/O register 312 is then loaded into the memory core array 314 in the same manner as in the high performance channel mode without the need to reconfigure the DRAM internal structure or reduce the amount of usable memory space available in the low performance channel mode.

Figure 5:
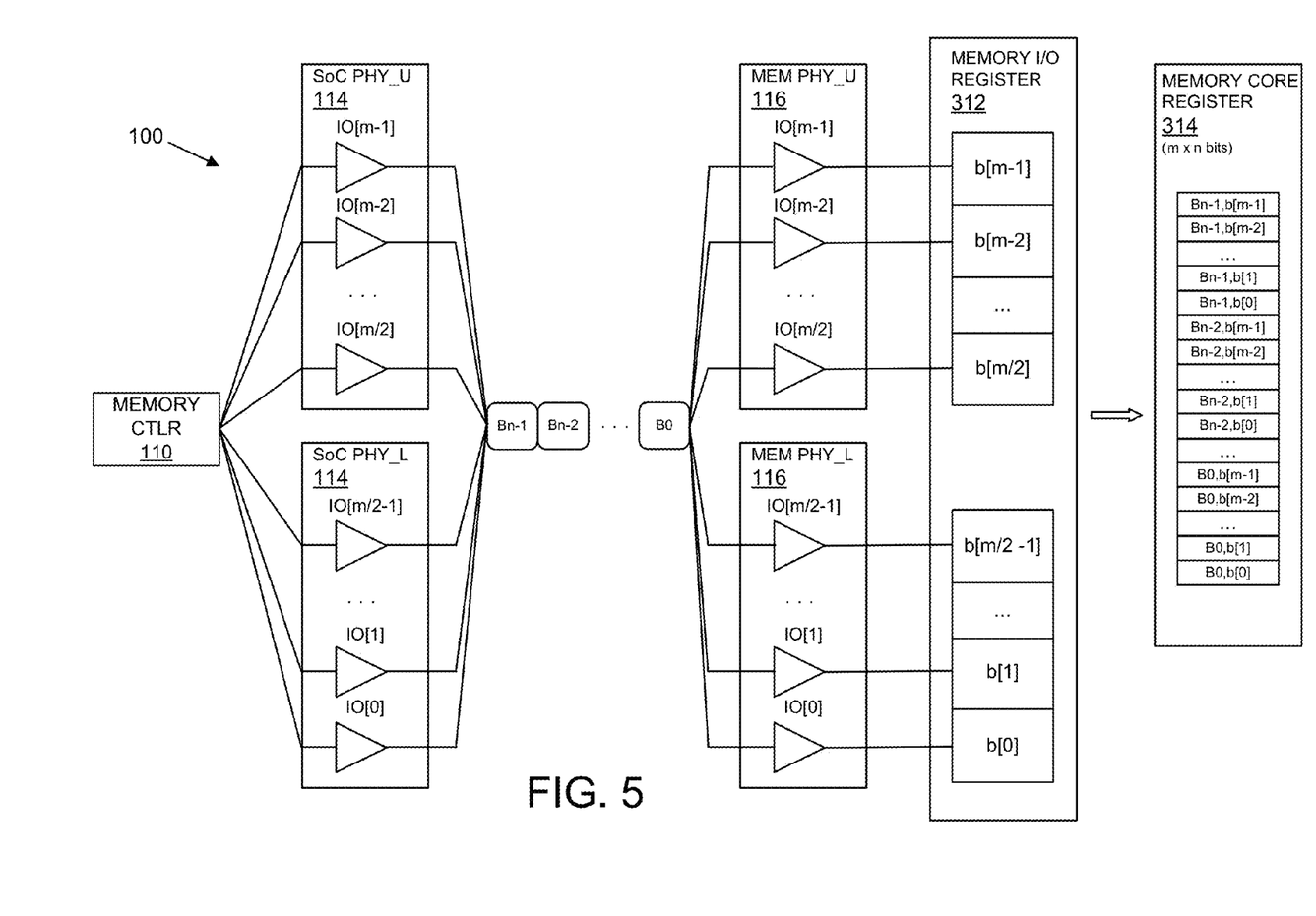
FIG. 5 is a block diagram illustrating another single channel embodiment of the system of FIG. 3 in the high performance mode.
Figure 6:
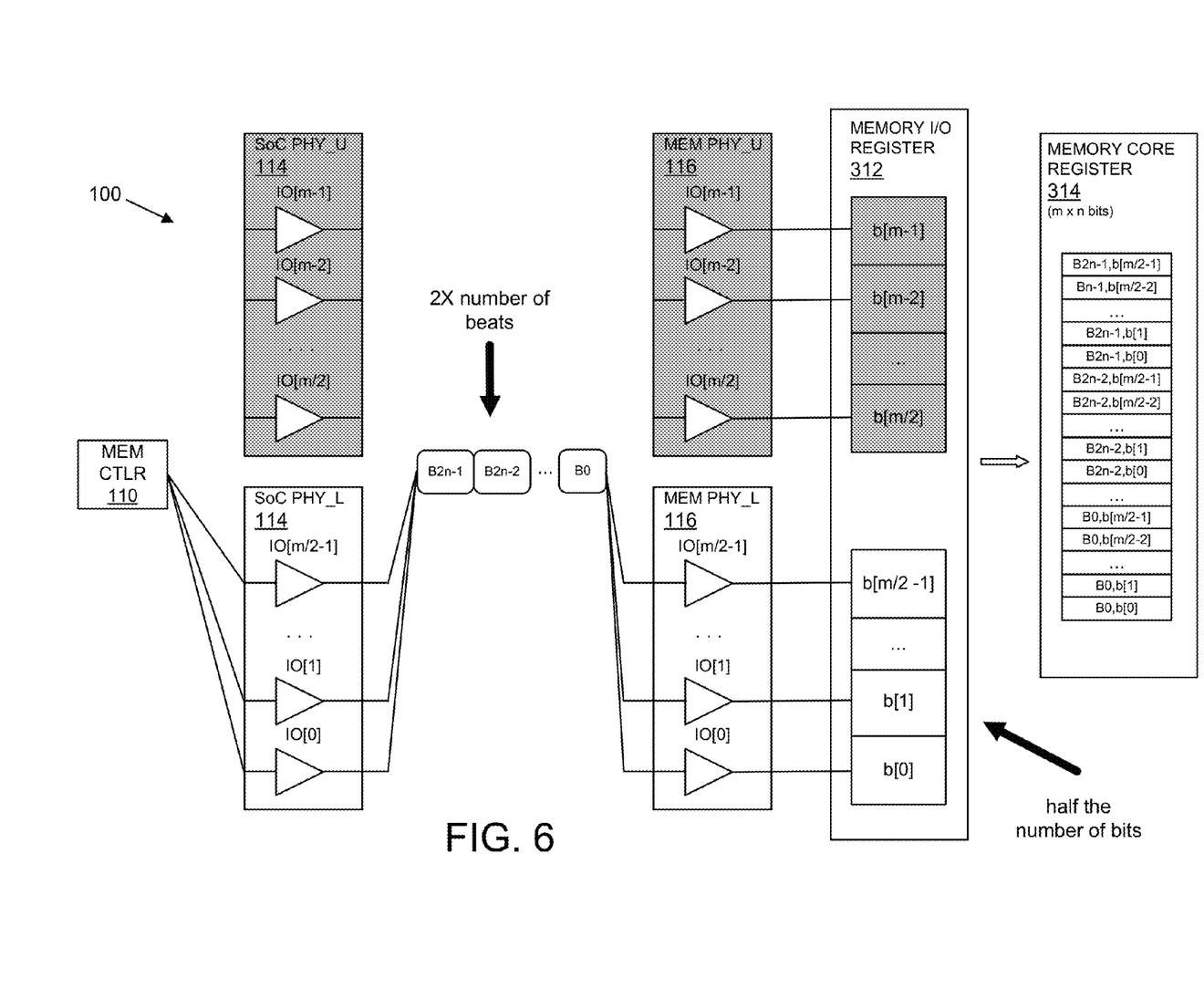
FIG. 6 illustrates the system of FIG. 5 in the low performance mode.

FIGS. 5 & 6 illustrate another embodiment of a single channel implementation of the dynamic memory I/O resizing. FIG. 5 illustrates the system 100 in the high performance channel mode. FIG. 6 illustrates the system 100 in the low performance channel mode. The SoC 102 comprises a memory controller 110 for processing memory requests to the DRAM memory system 104 between a pair of SoC physical layer devices 114 (SoC PHY_U and SoC PHY_L) and respective memory physical layer devices 116 (Mem PHY_U and Mem PHY_L). The DRAM memory system 104 comprises the memory I/O register 312 and the memory core register 314.

Referring to FIG. 5, the SoC physical layer devices 114 and the memory physical layer devices 116 comprise line drivers for providing bits to, and receiving the corresponding bits, from the memory bus 106. SoC PHY_U and memory PHY_U comprise line drivers IO[m−1], IO[m−2] . . . IO[m/2], where m=channel width. SoC PHY_L and memory PHY_L comprise line drivers IO[m/2] . . . IO[1] . . . IO[0]. As further illustrated in FIG. 5, the memory bus 106 comprises a single memory channel comprising n beats, where n=number of beats, B=a single m-bit beat, and b=an individual bit within a beat (B). The memory I/O register 312 receives and stores the incoming data, which is loaded into the memory core register 314.

As illustrated in FIG. 6, in the low performance channel mode, the channel width is reduced from m to m/2 with the SoC PHY_U and the memory PHY_U being disabled to yield desirable power savings. To maintain the predefined MAL size with half the bus width (m/2), the SoC 102 is configured to double the number of beats (2n). The memory I/O register 312 receives and stores half the number of bits, which are loaded into the memory core register 314.

Figure 7:
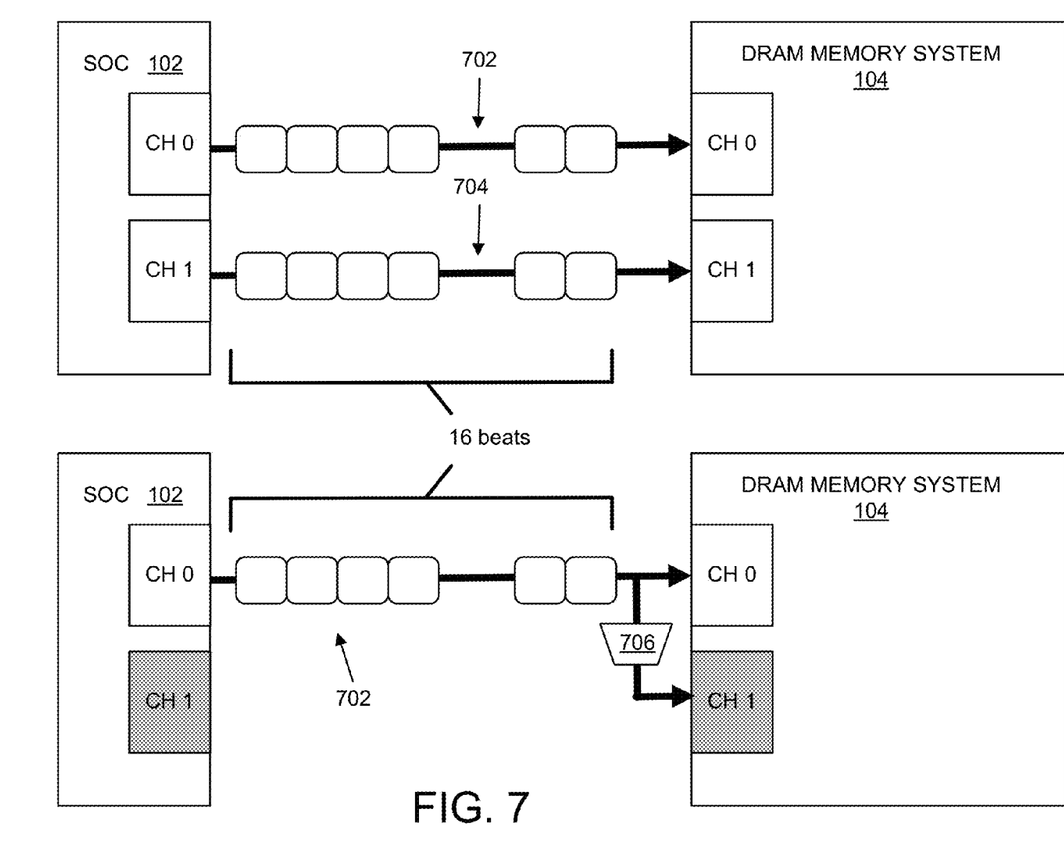
FIG. 7 is a block diagram illustrating a dual channel embodiment of the system of FIG. 1.

FIG. 7 illustrates an embodiment of a dual channel implementation of the dynamic memory I/O resizing. The SoC 102 and the DRAM memory system 104 may comprise two memory channels 702 and 704 (Ch 0 and Ch 1). In high performance use cases (illustrated in the top diagram of FIG. 7), both channels 702 and 704 are active with 16 beats of data from SoC:Ch0 going to DRAM:Ch0 and 16 beats of data from SoC:Ch1 going to DRAM:Ch1.

When a relatively lower performance use case is desired, the system 100 may dynamically reconfigure the size of the memory channel width by, for example, disabling one of the memory channels. As illustrated in the bottom diagram of FIG. 7, memory channel 704 may be disabled to achieve desired power savings. Active memory channel 702 comprises 16 beats with the data being multiplexed between the DRAM:Ch0 and DRAM:Ch1 by multiplexer(s) 706. It should be appreciated that the multiplexer(s) 706 may be placed at various points in the datapath (e.g., before or after memory I/O register(s) 312, inside or outside the DRAM, etc.).

Figure 8:
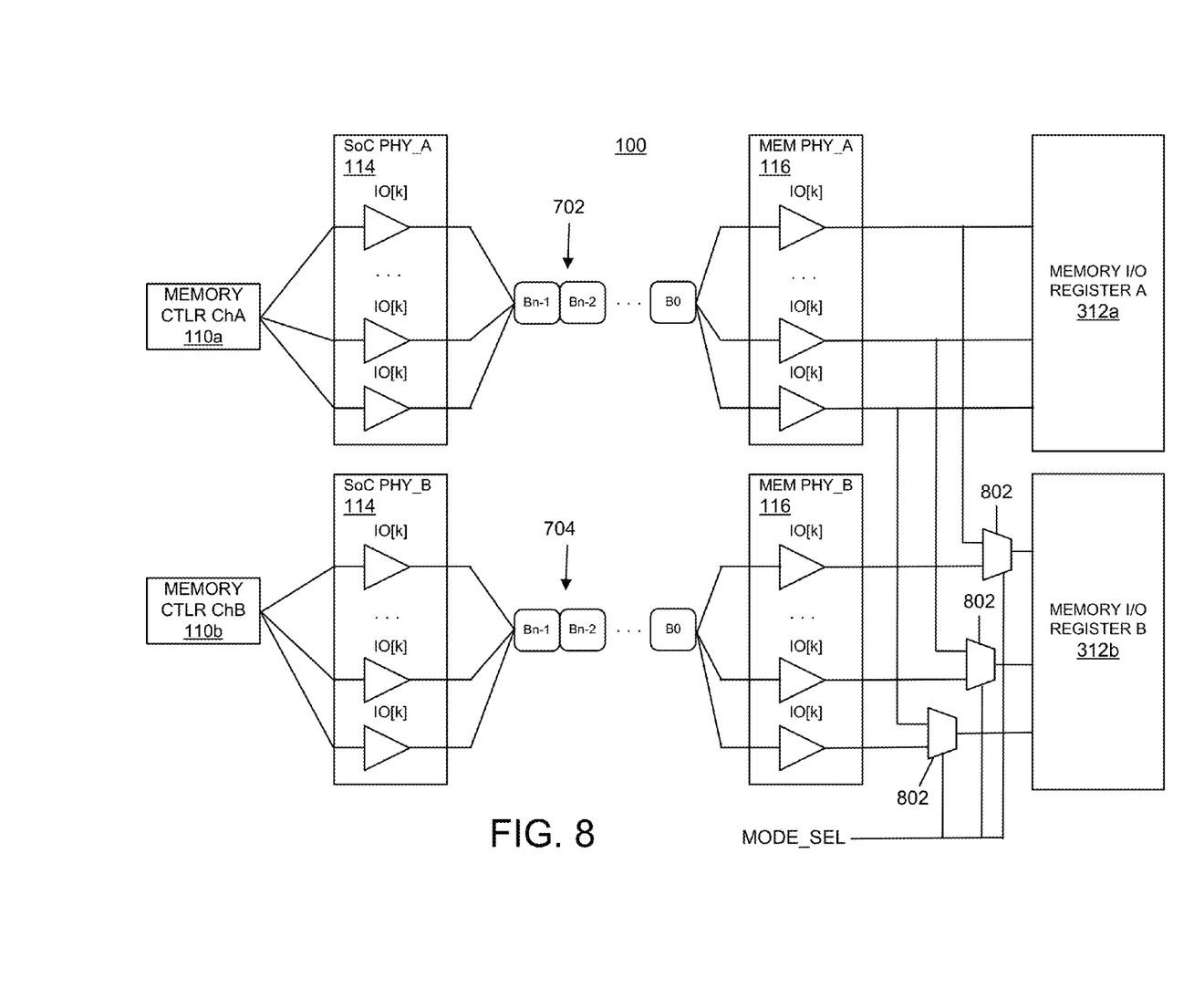
FIG. 8 is a block diagram illustrating another dual channel embodiment of the system of FIG. 1.
Figure 9:
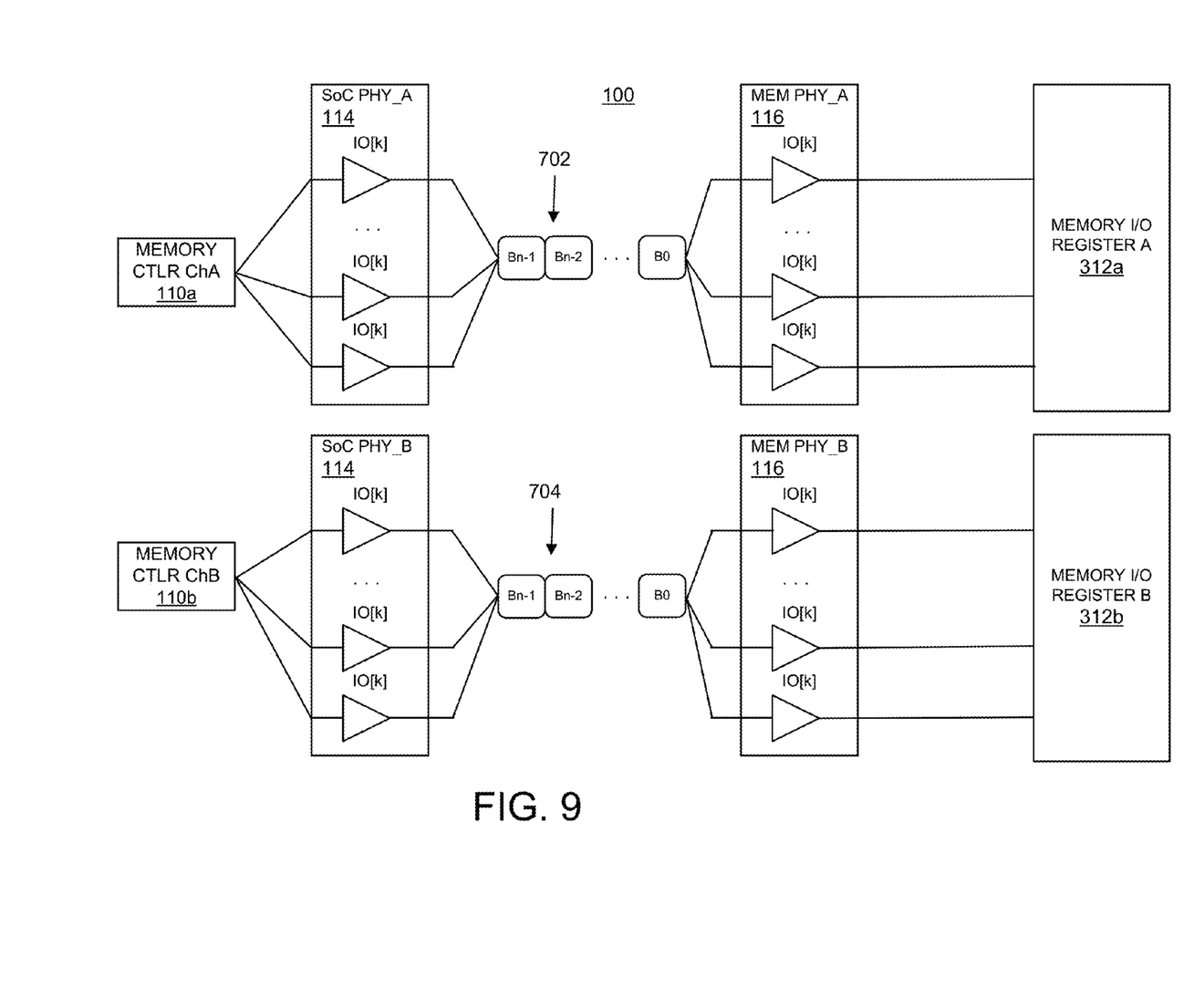
FIG. 9 illustrates the system of FIG. 8 in the high performance mode.
Figure 10:
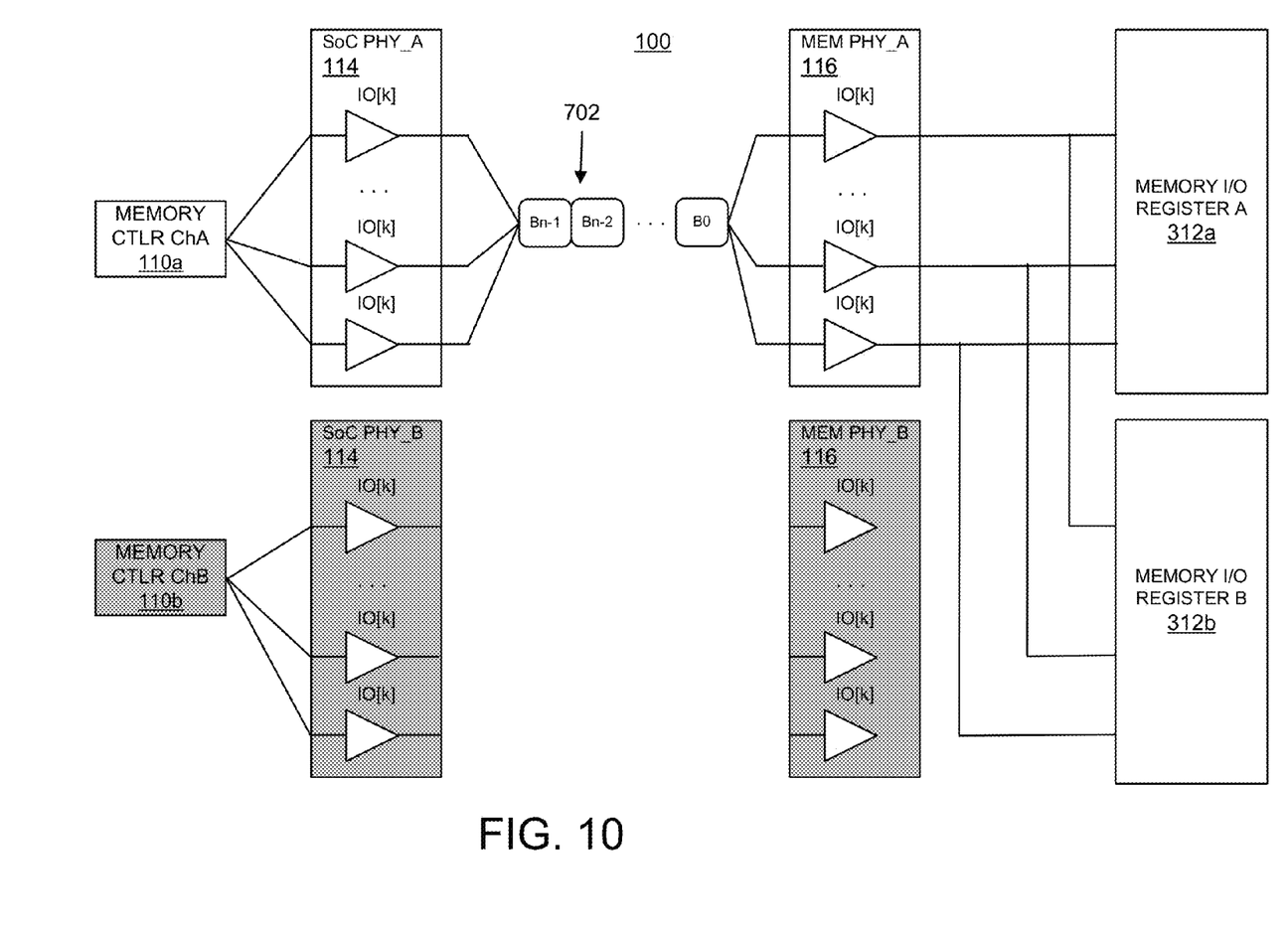
FIG. 10 illustrates the system of FIG. 8 in the low performance mode.

FIGS. 8-10 illustrate another embodiment of a dual channel implementation of the dynamic memory I/O resizing, which follows the same reference notation as in FIGS. 5 & 6: m=channel width, n=number of beats, and B=a single m-bit beat. As illustrated in FIG. 8, the SoC 102 comprises two memory controllers 110a and 110b. Memory controller 110a corresponds to memory channel 702 for processing memory requests to the DRAM memory system 104 between SoC PHY_A and memory PHY_A. Memory controller 110b corresponds to memory channel 704 for processing memory requests to the DRAM memory system 104 between SoC PHY_B and memory PHY_B. In the high performance mode of operation (FIGS. 8 & 9), memory data from memory PHY_A is received and stored in memory I/O register 312a. Memory data from memory PHY_B is received and stored in memory I/O register 312b.

As further illustrated in FIGS. 8-10, the SoC physical layer devices 114a and 114b and the memory physical layer devices 116a and 116b may comprise a plurality of line drivers IO[k], where m=channel width, 0≤k≤m−1. Referring to FIG. 8, a memory PHY_A line driver IO[m−1] and a memory PHY_B line driver IO[m−1] may comprise inputs to a multiplexer 802 for controlling (via MODE_SEL) which data is provided to the memory I/O register 312b. In the low performance mode of operation (FIG. 10), the memory channel 704 may be disabled to halve the memory bus width and yield desired power savings. The multiplexer 802 may selectively provide data from memory PHY_A line driver IO[m−1] to either the memory I/O register 312a or the memory I/O register 312b. It should be appreciated that the other memory PHY_A and memory PHY_B line drivers IO[k] may be similarly multiplexed.

It should be appreciated that the embodiments illustrated in FIGS. 5-10 implement a memory write operation in which the data from the SoC 102 may be written to the DRAM memory system 104. One of ordinary skill in the art will appreciate that the above-described methods may be applied in the reverse direction and that power savings may be obtained during the memory read operation in which the data from the DRAM memory system 104 is returned to the SoC 102.

Figure 11:
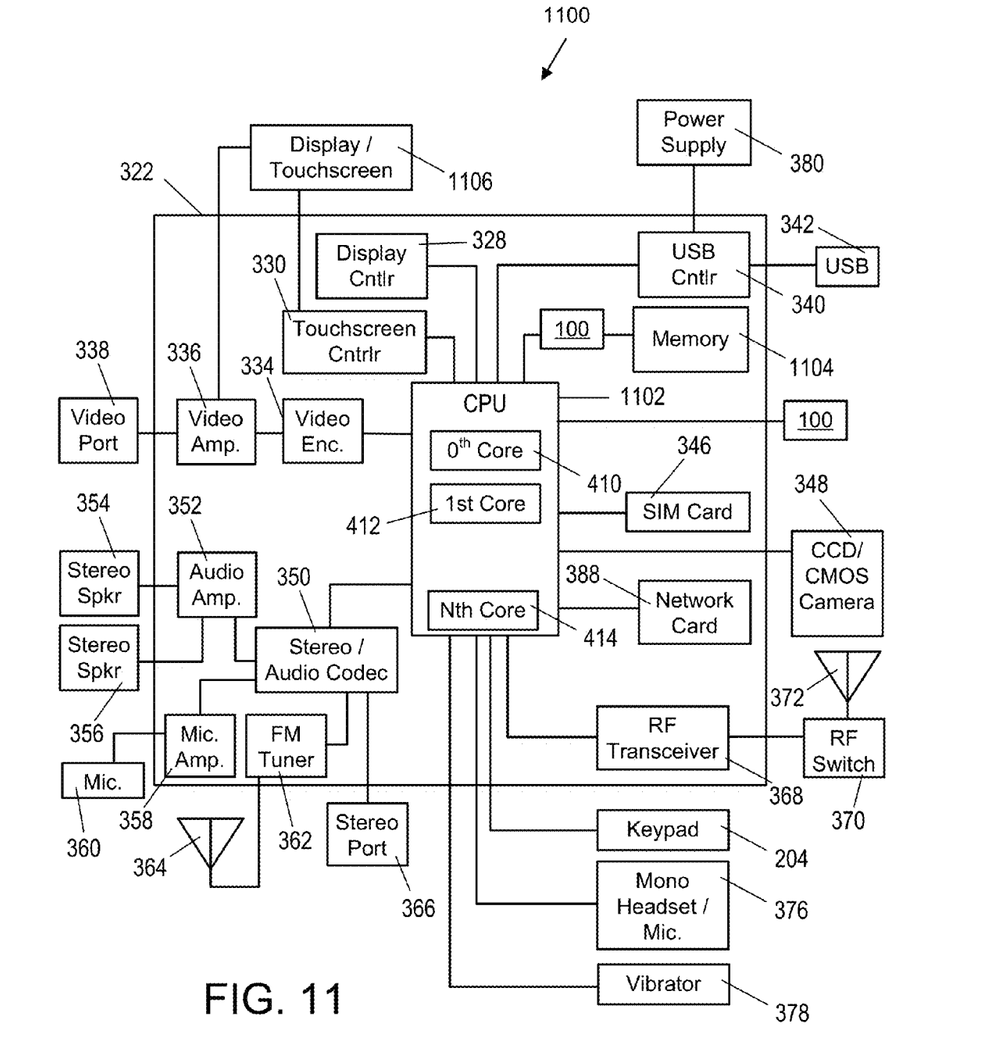
FIG. 11 is a block diagram of an embodiment of a portable computer device that incorporates the system of FIG. 1.

As mentioned above, the system 100 may be incorporated into any desirable computing system. FIG. 11 illustrates the system 100 incorporated in an exemplary portable computing device (PCD) 1100. It will be readily appreciated that certain components of the system 100 may be included on the SoC 322 (FIG. 12) while other components (e.g., the DRAM memory system 104) may comprise external components coupled to the SoC 322. The SoC 322 may include a multicore CPU 1102. The multicore CPU 1102 may include a zeroth core 410, a first core 412, and an Nth core 414. One of the cores may comprise, for example, a graphics processing unit (GPU) with one or more of the others comprising the CPU.

A display controller 328 and a touch screen controller 330 may be coupled to the CPU 1202. In turn, the touch screen display 1106 external to the on-chip system 322 may be coupled to the display controller 1106 and the touch screen controller 330.

FIG. 11 further shows that a video encoder 334, e.g., a phase alternating line (PAL) encoder, a sequential color a memoire (SECAM) encoder, or a national television system(s) committee (NTSC) encoder, is coupled to the multicore CPU 1102. Further, a video amplifier 336 is coupled to the video encoder 334 and the touch screen display 1106. Also, a video port 338 is coupled to the video amplifier 336. As shown in FIG. 11, a universal serial bus (USB) controller 340 is coupled to the multicore CPU 1102. Also, a USB port 342 is coupled to the USB controller 340. Memory 1104 and a subscriber identity module (SIM) card 346 may also be coupled to the multicore CPU 1102. Memory 1104 may reside on the SoC 322 or be coupled to the SoC 322 (as illustrated in FIG. 1). The memory 1104 may comprise DRAM memory system 104 (FIG. 1) as described above.

Further, as shown in FIG. 11, a digital camera 348 may be coupled to the multicore CPU 1102. In an exemplary aspect, the digital camera 348 is a charge-coupled device (CCD) camera or a complementary metal-oxide semiconductor (CMOS) camera.

As further illustrated in FIG. 11, a stereo audio coder-decoder (CODEC) 350 may be coupled to the multicore CPU 1102. Moreover, an audio amplifier 352 may coupled to the stereo audio CODEC 350. In an exemplary aspect, a first stereo speaker 354 and a second stereo speaker 356 are coupled to the audio amplifier 352. FIG. 11 shows that a microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 11 further illustrates that a radio frequency (RF) transceiver 368 may be coupled to the multicore CPU 402A. An RF switch 370 may be coupled to the RF transceiver 368 and an RF antenna 372. As shown in FIG. 11, a keypad 204 may be coupled to the multicore CPU 1102. Also, a mono headset with a microphone 376 may be coupled to the multicore CPU 1102. Further, a vibrator device 378 may be coupled to the multicore CPU 1202.

FIG. 11 also shows that a power supply 380 may be coupled to the on-chip system 322. In a particular aspect, the power supply 380 is a direct current (DC) power supply that provides power to the various components of the PCD 1100 that require power. Further, in a particular aspect, the power supply is a rechargeable DC battery or a DC power supply that is derived from an alternating current (AC) to DC transformer that is connected to an AC power source.

FIG. 11 further indicates that the PCD 1100 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

As depicted in FIG. 11, the touch screen display 1106, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 322.

It should be appreciated that one or more of the method steps described herein may be stored in the memory as computer program instructions, such as the modules described above. These instructions may be executed by any suitable processor in combination or in concert with the corresponding module to perform the methods described herein.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for conserving power consumption in a memory system, the method comprising:
receiving a memory request from a memory client residing on a system on chip (SoC) for accessing a dynamic random access memory (DRAM) memory system coupled to the SoC via a memory bus comprising a single memory channel;
determining that the memory request from the memory client corresponds to a performance use case for using less than a full width of the memory bus; and
conserving memory power consumption for the memory request corresponding to the performance use case by dynamically resizing the memory bus to less than the full width, wherein dynamically resizing the memory bus to less than the full width comprises:
reducing the bus width from a first channel width to a second channel width; and
increasing a number of beats across the single memory channel to maintain a minimum access length (MAL) defined by the DRAM memory system.

2. The method of claim 1, wherein the memory client comprises one of a central processing unit (CPU), a graphics processing unit (GPU), and a digital signal processor (DSP) residing on the SoC.

3. The method of claim 1, wherein the memory bus comprises a N-bit channel, and the dynamically resizing the bus width of the memory bus comprises reducing the N-bit channel to a (N−M)-bit channel.

4. The method of claim 1, wherein the reducing the bus width from the first channel width to the second channel width comprises disabling a SoC physical layer device in the SoC and a memory physical layer device in the DRAM memory system.

5. The method of claim 1, wherein the memory bus further comprises a second memory channel.

6. The method of claim 5, wherein the single memory channel is associated with a first DRAM device and the second memory channel is associated with a second DRAM device, and wherein reducing the bus width from a first channel width to a second channel width comprises disabling the second memory channel.

7. The method of claim 6, further comprising: multiplexing the single memory channel between the first and second DRAM devices.

8. The method of claim 7, wherein the multiplexing is performed in the DRAM memory system.

9. A system for conserving power consumption in a memory system, the method comprising:
means for receiving a memory request from a memory client residing on a system on chip (SoC) for accessing a dynamic random access memory (DRAM) memory system coupled to the SoC via a memory bus comprising a single memory channel;
means for determining that the memory request from the memory client corresponds to a performance use case for using less than a full width of the memory bus; and
means for conserving memory power consumption for the memory request corresponding to the performance use case by dynamically resizing the memory bus to less than the full width wherein dynamically resizing the memory bus to less than the full width comprises:
reducing the bus width from a first channel width to a second channel width; and
increasing a number of beats across the single memory channel to maintain a minimum access length (MAL) defined by the DRAM memory system.

10. The system of claim 9, wherein the memory client comprises one of a central processing unit (CPU), a graphics processing unit (GPU), and a digital signal processor (DSP) residing on the SoC.

11. The system of claim 9, wherein the memory bus comprises a N-bit channel, and the dynamically resizing the bus width of the memory bus comprises: means for reducing the N-bit channel to a (N−M)-bit channel.

12. The system of claim 9, wherein the means for reducing the bus width from the first channel width to the second channel width comprises means for disabling a SoC physical layer device in the SoC and a memory physical layer device in the DRAM memory system.

13. The system of claim 9, wherein the memory bus further comprises a second memory channel.

14. The system of claim 13, wherein the single memory channel is associated with a first DRAM device and the second memory channel is associated with a second DRAM device, and wherein reducing the bus width from a first channel width to a second channel width comprises: means for disabling the second memory channel.

15. The system of claim 14, further comprising: means for multiplexing the single memory channel between the first and second DRAM devices.

16. The system of claim 15, wherein the multiplexing is performed in the DRAM memory system.

17. A computer program product comprising a computer usable device having a computer readable program code embodied therein, the computer readable program code adapted to be executed to implement a method for conserving power consumption in a memory system, the method comprising:
receiving a memory request from a memory client residing on a system on chip (SoC) for accessing a dynamic random access memory (DRAM) memory system coupled to the SoC via a memory bus comprising a single memory channel;
determining that the memory request from the memory client corresponds to a performance use case for using less than a full width of the memory bus; and
conserving memory power consumption for the memory request corresponding to the performance use case by dynamically resizing the memory bus to less than the full width, wherein dynamically resizing the memory bus to less than the full width comprises:
reducing the bus width from a first channel width to a second channel width; and
increasing a number of beats across the single memory channel to maintain a minimum access length (MAL) defined by the DRAM memory system.

18. The computer program product of claim 17, wherein the memory client comprises one of a central processing unit (CPU), a graphics processing unit (GPU), and a digital signal processor (DSP) residing on the SoC.

19. The computer program product of claim 17, wherein the memory bus comprises a N-bit channel, and the dynamically resizing the bus width of the memory bus comprises reducing the N-bit channel to a (N-M)-bit channel.

20. The computer program product of claim 17, wherein the reducing the bus width from the first channel width to the second channel width comprises disabling a SoC physical layer device in the SoC and a memory physical layer device in the DRAM memory system.

21. The computer program product of claim 17, wherein the memory bus further comprises a second memory channel.

22. The computer program product of claim 21, wherein the single memory channel is associated with a first DRAM device and the second memory channel is associated with a second DRAM device, and wherein reducing the bus width from a first channel width to a second channel width comprises disabling the second memory channel.

23. The computer program product of claim 22, wherein the method further comprises: multiplexing the single memory channel between the first and second DRAM devices.

24. The computer program product of claim 23, wherein the multiplexing is performed in the DRAM memory system.

25. A system for conserving power consumption in a memory system, the system comprising:
 a DRAM memory system; and
 a system on chip (SoC) coupled to the DRAM memory system via a memory bus comprising a single memory channel, the SoC comprising one or more memory controllers for processing memory requests from one or more memory clients for accessing the DRAM memory system, wherein the one or more memory controllers are configured to selectively conserve memory power consumption by dynamically resizing a memory bus width of the memory bus to less than a full width, wherein dynamically resizing the memory bus width to less than the full width comprises reducing the bus width from a first channel width to a second channel width and increasing a number of beats across the single memory channel to maintain a minimum access length (MAL) defined by the DRAM memory system.

26. The system of claim 25, wherein the memory clients comprise one of a central processing unit (CPU), a graphics processing unit (GPU), and a digital signal processor (DSP) residing on the SoC.

27. The system of claim 25, wherein the memory bus comprises a N-bit channel, and the dynamically resizing the bus width of the memory bus comprises reducing the N-bit channel to a (N−M)-bit channel.

28. The system of claim 25, wherein the reducing the bus width from the first channel width to the second channel width comprises disabling a SoC physical layer device in the SoC and a memory physical layer device in the DRAM memory system.

29. The system of claim 25, wherein the memory bus further comprises a second memory channel.

30. The system of claim 29, wherein the single memory channel is associated with a first DRAM device and the second memory channel is associated with a second DRAM device, and wherein reducing the bus width from a first channel width to a second channel width comprises disabling the second memory channel.

31. The system of claim 30, wherein further the single memory channel is multiplexed between the first and second DRAM devices.

32. The system of claim 31, wherein the multiplexing is performed in the DRAM memory system.

* * * * *